US010604235B2

(12) United States Patent
Tajan et al.

(10) Patent No.: US 10,604,235 B2
(45) Date of Patent: Mar. 31, 2020

(54) PITCH CHANGE MODULE FOR TURBINE ENGINE AND CORRESPONDING TURBINE ENGINE

(71) Applicant: SAFRAN AIRCRAFT ENGINES, Paris (FR)

(72) Inventors: Sébastien Emile Philippe Tajan, Sucy en Brie (FR); Gilles Alain Marie Charier, La Grande Paroisse (FR); Clément Cottet, Melun (FR); Adrien Jacques Philippe Fabre, Montrouge (FR); Christophe Marcel Lucien Perdrigeon, Ballainvilliers (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 228 days.

(21) Appl. No.: 15/673,322

(22) Filed: Aug. 9, 2017

(65) Prior Publication Data

US 2018/0043990 A1    Feb. 15, 2018

(30) Foreign Application Priority Data

Aug. 10, 2016 (FR) ...................... 16 57684

(51) Int. Cl.
*B64C 11/32* (2006.01)
*B64C 11/30* (2006.01)
(Continued)

(52) U.S. Cl.
CPC .............. *B64C 11/32* (2013.01); *B64C 11/30* (2013.01); *F01D 7/00* (2013.01); *F01D 25/16* (2013.01);
(Continued)

(58) Field of Classification Search
CPC . B64C 11/30; F01D 25/16; F01D 7/00; Y02T 50/66; F05D 2260/79; F05D 2220/323; B64D 2027/005
(Continued)

(56) References Cited

U.S. PATENT DOCUMENTS

2009/0311100 A1* 12/2009 Gallet ..................... B64C 11/32
                                                            416/159
2012/0070290 A1*  3/2012 Balk ....................... B64C 11/32
                                                            416/147
(Continued)

FOREIGN PATENT DOCUMENTS

FR        2980770        10/2011
FR        2980770 A1 *   4/2013 ............. B64C 11/20
(Continued)

OTHER PUBLICATIONS

French Search Report and Written Opinion, dated Apr. 5, 2017, French Application No. 1657684.

*Primary Examiner* — J. Todd Newton
(74) *Attorney, Agent, or Firm* — Womble Bond Dickinson (US) LLP

(57) ABSTRACT

The invention relates to turbine engine module (1) including a case (9) rotating around a longitudinal axis (X) and carrying a propeller having a plurality of blades, a stationary case (15) comprising a cylindrical wall (16) extending between an inner wall (17) and an outer wall (18) of the rotating case (9), and a system (26) for changing the pitch of the blades (14) of the propeller. The wall (16) is connected downstream to a first frustoconical wall (42) and upstream to a second frustoconical wall (41), a first rolling bearing (19) being inserted respectively downstream directly between a radially outer face (21) of the inner wall (17) and a radially inner face (23) of the first frustoconical wall, and a second rolling bearing (19') inserted downstream directly (Continued)

between the radially outer face (21) of the inner wall (17) and an inner face (43) of the second frustoconical wall (41).

12 Claims, 3 Drawing Sheets

(51) Int. Cl.
    *F01D 7/00*     (2006.01)
    *F01D 25/16*     (2006.01)
    *B64D 27/00*     (2006.01)

(52) U.S. Cl.
    CPC .. *B64D 2027/005* (2013.01); *F05D 2220/323* (2013.01); *F05D 2260/79* (2013.01); *Y02T 50/66* (2013.01)

(58) Field of Classification Search
    USPC ......................................................... 416/153
    See application file for complete search history.

(56) References Cited

U.S. PATENT DOCUMENTS

| | | | |
|---|---|---|---|
| 2012/0079808 A1* | 4/2012 | Glynn | F01D 7/00 60/268 |
| 2012/0093652 A1* | 4/2012 | Belmonte | B64C 11/06 416/147 |
| 2014/0205457 A1 | 7/2014 | Curlier et al. | |
| 2014/0294585 A1 | 10/2014 | Escure et al. | |
| 2018/0043990 A1* | 2/2018 | Tajan | B64C 11/32 |

FOREIGN PATENT DOCUMENTS

| | | |
|---|---|---|
| FR | 3013325 | 5/2015 |
| GB | 252365 | 9/2015 |
| WO | WO-2017118794 | 7/2017 |

\* cited by examiner

PITCH CHANGE MODULE FOR TURBINE ENGINE AND CORRESPONDING TURBINE ENGINE

1. FIELD OF THE INVENTION

The present invention relates to the field aeronautic propulsion. It more particularly relates to a module for changing the pitch of blades of a propeller driven by a turbine engine and the corresponding turbine engine.

2. BACKGROUND OF THE INVENTION

The change of pitch or variable calibration of the pitches of blades of a turbine engine propeller is one avenue for improving the performance and output of turbine engines under different flight conditions.

It is known turbine engine such as turboprops, for example with despun propellers, referred to by the expressions "open rotor" and "unducted fan", equipped with these pitch change systems. Turboprops differ from turbojet engines by the use of a propeller outside the nacelle (unducted) instead of an internal fan. The pitch change system may also apply to a turboprop with a single propeller or adapt indifferently to several propellers.

In a turboprop of the open rotor type, a gas-generating part and a propulsion part are aligned and arranged in a stationary cylindrical nacelle supported by the structure of the aircraft. The gas-generating part can be arranged in front of or behind the propulsion part. The propulsion part includes a pair of coaxial and often despun propellers, upstream and downstream, respectively, that are rotated often in opposite directions relative to one another by a turbine, in particular a low-pressure turbine, of the gas-generating part via a reduction gear or a epicyclic gearbox. The propellers extend substantially radially across from the transmission shaft outside the nacelle. In general, each propeller comprises a hub with an outer polygonal ring received rotatably in the stationary nacelle and having radial cylindrical housings distributed on its periphery around the longitudinal axis of the turbine engine. The shafts of the root of the blades are received in the housings of the rings.

The system for changing the pitch of each propeller is installed in the core of the rotary parts, for example with a power cylinder driving the root of the blades for their pitch change rotation. The annular power cylinder includes a cylinder mounted on a flange secured to a stationary part of the turbine engine and a piston connected to the root of the blades by a connecting mechanism. A bearing is arranged between the flange secured to the stationary part and the cylinder of the power cylinder. The movement of the piston following the fluid command of the annular power cylinder ensures the desired angular pivoting of the blades by the connecting mechanism by varying their pitch. Such pitch change systems in turbine engines with despun propellers are known from documents US-A1-20120079808, FR-A1-2980770 and FR-A1-3013325.

One of the difficulties of this architecture consists of converting power arriving from the stationary part into movement on the rotating part of the turbine engine. Another difficulty lies in the dimensioning and the integration of the various elements into this rotating part. In particular, the flange secured to the stationary part of the turbine engine and the bearing induce a significant lever arm that involves dimensioning difficulties. Furthermore, the power cylinder is subject to substantial radial forces from the rotary part that involve deformations of the power cylinder as well as sealing problems. These forces are multiplied when the power cylinder is such that it plays a structural role. The dimensioning difficulties are also due to limited space constraints to arrange the pitch change system, the arrangement and balancing of the rolling bearings, and the passages of the compartments necessary for the operation of the power cylinder of each propeller. This results in a complex arrangement and additional equipment that affect the drag.

3. AIM OF THE INVENTION

The present invention in particular aims to propose a new nonstructural configuration of the system for changing the pitch of blades of a propeller in a turbine engine. A nonstructural configuration refers to elements designed not to withstand forces and that do not play a "load-bearing" role. On the contrary, in the prior state of the art, the structural configuration makes up load-bearing elements configured to withstand forces. It also aims to provide a solution allowing the integration, arrangement and dimensioning of the pitch change system, and in particular rolling bearings, compared with the known solutions.

4. BRIEF DESCRIPTION OF THE INVENTION

These aims are achieved, according to the invention, with a turbine engine module having a longitudinal axis including:
- a case rotating around the longitudinal axis and carrying a propeller provided with a plurality of blades;
- a stationary case comprising a cylindrical wall extending between an inner wall and an outer wall of the rotating case; and
- a system for changing the pitch of the blades of the propeller comprising a connecting mechanism connected to the blades of the propeller and a control means acting on the connecting mechanism, the cylindrical wall of the stationary case being connected downstream to a first substantially frustoconical wall and upstream to a second substantially frustoconical wall, a first rolling bearing being inserted respectively downstream directly between a radially outer face of the inner wall of the rotating case and a radially inner face of the first frustoconical wall, and a second rolling bearing inserted upstream directly between the radially outer face of the inner wall of the rotating case and an inner face of the second frustoconical wall.

In the present invention, the expression "substantially frustoconical wall" refers to a wall of revolution around the axis that comprises a segment flaring in a direction parallel to the axis.

Thus, this solution makes it possible to achieve the aforementioned aim. In particular, the stationary case equipped with frustoconical walls upstream and downstream creates a flaring at both ends of the cylindrical wall of the stationary case, which makes it possible to optimize the space available to integrate the pitch change system, and in particular the control means. Furthermore, this configuration also allows greater freedom in choosing the rolling bearings as well as making it easy to integrate them into the rotary and stationary parts. Indeed, in the known solutions, the rolling bearings, in particular the rolling bearing installed downstream from the rotary and stationary parts, are small, which makes effective simultaneous radial and axial maintenance of the rotary case on the stationary case difficult.

According to another advantageous, but non-limiting, feature, the pitch change system is arranged axially between the first and second frustoconical walls of the stationary case so as to facilitate its integration and its assembly.

According to another feature of the invention, the inner wall and the opposite outer wall of the rotary case form a space in which the cylindrical wall of the stationary case extends, which has said outer face and said inner face opposite one another.

According to another feature of the invention, the pitch change system is arranged in the space formed by the inner and outer walls of the rotary case.

In particular, the pitch change system is arranged radially between the cylindrical wall of the stationary case and the outer wall of the rotary case.

According to another feature of the invention, the control means is mounted non-structurally and separately from the stationary case, the control means comprising a stationary body secured to the outer face of the cylindrical wall and a movable body translatable along the longitudinal axis relative to the stationary body. On the one hand, this arrangement allows compactness and the risk-free passage of the compartments connected to the power supply and the operation of the control means. The control means of this pitch change system is configured so as no longer to support the rotary parts and no longer to be subject to radial forces. In particular, the control means no longer undergoes a bending strain, which could cause misalignments and harmful leaks for the control means. On the other hand, also owing to this nonstructural arrangement, it is possible to manage the integration of the control means and the stationary and rotary cases independently. This results in easier assembly and space savings.

Advantageously, but non-limitingly, the second rolling bearing has an inner diameter larger than the inner diameter of the cylindrical wall of the stationary case and the inner wall of the rotary case. Such a configuration makes it possible to facilitate the integration of the bearings and allows better maintenance of the rotary case relative to the stationary case.

According to another advantageous, but non-limiting, feature, the first rolling bearing has an inner diameter larger than the inner diameter of the cylindrical wall of the stationary case and the inner wall of the rotary case. As previously stated, this makes it possible to facilitate the integration of the bearings and allows better maintenance of the rotary case relative to the stationary case.

According to another feature of the invention, the movable body comprises a connecting ring provided with connection interfaces with the stationary case and secured to the outer face of the cylindrical wall of the stationary case. All of the mechanical, electrical and hydraulic interfaces to ensure the power supply and operation of the pitch change system are thus gathered on this ring, which allows easier access and upkeep.

According to another feature of the invention, a load transfer bearing is arranged between the connecting mechanism and the control means.

According to another feature of the invention, the pitch change system comprises an anti-rotation device fastened on the movable body and on the stationary body of the control means, the anti-rotation device comprising a cross-piece extending above the movable body and the stationary body. Such a configuration is due to the nonstructural assembly of the control means on the stationary case.

According to one feature of the invention, the rotary case and the stationary case comprise several walls of revolution.

Advantageously, but non-limitingly, the cylindrical wall of the stationary case is a wall of revolution.

In particular, the inner and outer walls of the rotary case are walls of revolution.

Advantageously, but non-limitingly, the control means comprises an actuator, the movable body of which slides around the cylindrical wall of the stationary case.

In particular, the actuator comprises an annular power cylinder.

According to one feature of the invention, the propeller is an upstream propeller of a pair of despun propellers.

The invention also relates to a turbine engine comprising a module having any one of the aforementioned features.

5. BRIEF DESCRIPTION OF THE FIGURES

The invention will be better understood, and other objects, details, features and advantages thereof will become more clearly apparent upon reading the detailed explanatory description which follows, of embodiments of the invention given as purely illustrative and non-limiting examples, with reference to the appended schematic drawings.

6. DETAILED DESCRIPTION OF THE INVENTION

Figure 1:
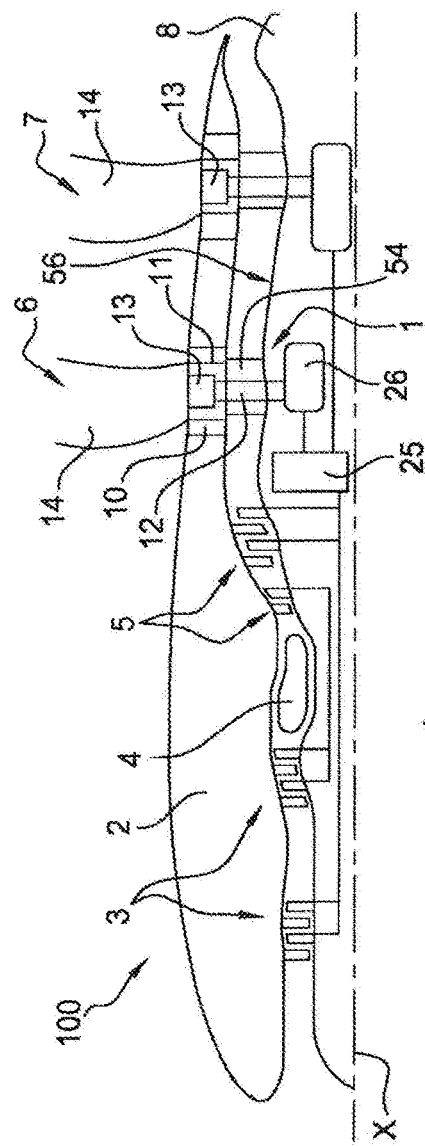
FIG. 1 is an axial sectional schematic view of an example turbine engine with a system for changing the pitch of blades of a propeller according to the invention.

In FIG. 1 and the rest of the description, a turboprop with an unducted fan with a longitudinal axis X intended to be mounted on an aircraft is shown. However, the invention may apply to other types of turbine engine.

The turbine engine 100 comprises a nacelle 2 in which a gas generator is arranged that comprises, from upstream to downstream, a set of compressors 3, a combustion chamber 4 and a set of turbines 5. A jet nozzle 8 is arranged downstream from the gas generator.

In the present invention, and in general, the terms "upstream" and "downstream" are defined relative to the circulation of the gases in the turbine engine.

The set of compressors 3 may comprise two compressors as shown in FIG. 1, or a single compressor typically with multiple stages, depending on the chosen gas generator architecture. The set of turbines 5 may comprise a high-pressure turbine and a low-pressure turbine like in the case considered in FIG. 1, or in an alternative that is not shown, a single turbine typically with several stages.

In the example embodiment shown in FIG. 1, the turbine engine comprises a pair of despun propellers with an upstream propeller 6 and a downstream propeller 7. These two upstream 6 and downstream 7 propellers are rotated by the low-pressure turbine of the set of turbines 5 via a mechanical transmission device 25 that is schematically and simply shown in FIG. 1. The upstream 6 and downstream 7 propellers are assembled coaxially to the longitudinal axis X of the turbine engine 100 and are arranged in parallel radial planes, which are perpendicular to the longitudinal axis X.

In the present example, the propellers 6, 7 are mounted downstream from the gas generator. The mechanical transmission device 25 may comprise a differential reduction gear or an epicyclic gearbox. It is of course possible to drive the upstream 6 and downstream 7 propellers directly by one of the turbines, in the case at hand the low-pressure turbine.

According to the configuration described above, the stream of air entering the turbine engine is compressed in the set of compressors 3, then mixed with fuel and burned in the combustion chamber 4. The created combustion gases next enter the turbines 5 to drive, via the mechanical transmission device 25, the propellers 6, 7 in contrarotating (inverse) rotation, providing the majority of the thrust. The combustion gases are expelled through the jet nozzle 8 while participating in the thrust of the turbine engine 100. The gases traverse a gas flow tunnel extending substantially axially in the turbine engine between an inner skin 56 associated with the gas generator and an outer skin relative to a radial axis perpendicular to the axis X.

Figure 2:
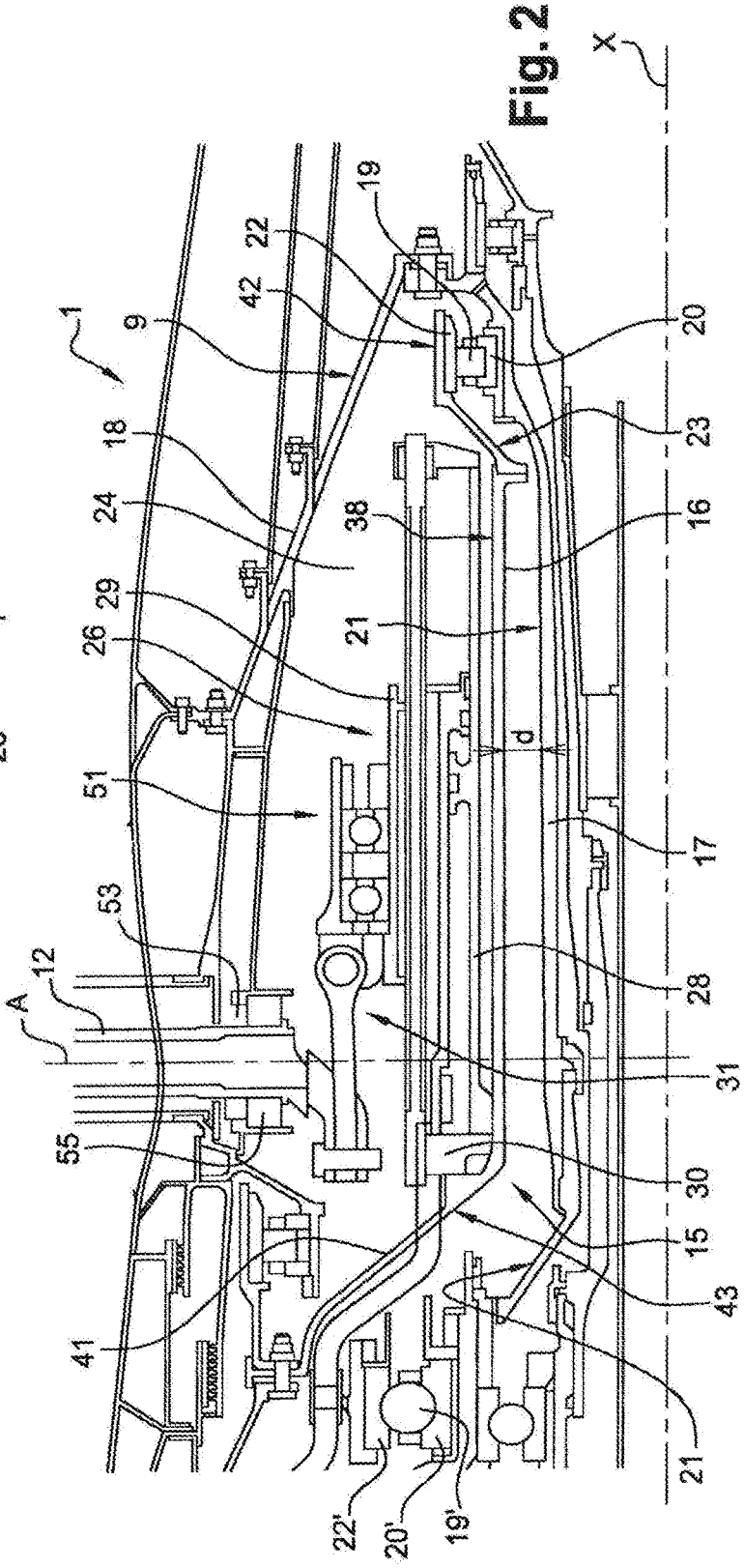
FIG. 2 is an axial sectional view schematically showing more details of the elements of a turbine engine module within a turbine engine according to the invention.

FIG. 2 shows a turbine engine module 1 with one of the propellers 6, 7. In the illustrated example, this is the upstream propeller 6. However, the description below may apply to the downstream propeller. The module 1 comprises a globally cylindrical case 9 mounted rotating in the nacelle 2 of the turbine engine around the longitudinal axis X. This rotary case 9, or rotor case, comprises a polygonal ring 10 (cf. FIG. 1), which is provided with radial cylindrical housings 11 regularly distributed on its periphery. These cylindrical housings 11 are traversed by radial shafts 12 with axes A each connected to the root 13 of the blades 14 of the propeller 6. The blades 14 extend radially outside the nacelle 2. The rotary case 9 is also connected to a corresponding part of the mechanical transmission device 25. The rotary case 9 also comprises several walls of revolution, including at least an inner wall 17 and an outer wall 18 relative to a radial axis, here, perpendicular to the longitudinal axis X. The inner and outer walls 17, 18 form an annular space 24 in the module. The outer wall 18 comprises radial cylindrical housings 53 regularly distributed on its periphery and also traversed by the radial shafts 12. The latter extend radially through a structural arm 54 connecting the polygonal ring 10 to part of the inner skin 56. Each radial shaft 12 is kept in its housing 53 using steps 55 arranged on the rotary case 9.

The rotary case 9 is directly supported by rolling bearings described below on a stationary case 15 or stator case to ensure its rotation relative to the longitudinal axis X. The stationary case 15 and the rotary case 9 are coaxial.

As illustrated in FIG. 2, the stationary case 15 also includes several walls of revolution. In particular, the stationary case 15 comprises a wall 16, here cylindrical with a circular section. The cylindrical wall 16 is connected at its downstream end to a first substantially frustoconical wall 42 centered on the axis X. It is also connected at its opposite end upstream to a second substantially frustoconical wall 41 centered on the axis X. The cylindrical wall 16 extends axially in the space 24 between the inner wall 17 and the outer wall 18 of the rotary case 9. The first wall 42 becomes wider or flares from upstream to downstream relative to the longitudinal axis X, while the second wall 41 becomes wider or flares from downstream to upstream. A first rolling bearing 19 is inserted, downstream, between the rotary case 9 and the stationary case 15. The first and second walls 41, 42 here each have a diameter becoming wider regularly from their connecting zones to the cylindrical wall 16. The first rolling bearing 19 comprises an inner ring 20 secured to the radially outer face 21 of the inner wall 17 of the rotary case 9, and an outer ring 22 secured to the radially inner face 23 of the first wall 42. A second rolling bearing 19' is inserted similarly, upstream, between the rotary case 9 and the stationary case 15. The inner ring 20' of the second rolling bearing 19' is secured to the radially outer face 21 of the inner wall 17 of the rotary case 9, while the outer ring 22' is supported by the inner face 43 of the second wall 41. In the illustrated example, the first rolling bearing 19 comprises a rolling bearing with rollers making it possible to withstand radial forces and allowing axial movements between the rings. The second rolling bearing 19' comprises a ball bearing making it possible to react the axial and radial forces. Advantageously, but non-limitingly, the inner diameter of the second rolling bearing 19' is larger than the outer diameter of the cylindrical wall 16 of the stationary case 15 and the inner wall 17 of the rotary case 9. The balls of this second rolling bearing 19' have a diameter of about 35 mm. The first rolling bearing 19 has an inner diameter substantially equal to the outer diameter of the cylindrical wall 16 of the stationary case 15. The rollers of the first rolling bearing 19 have a diameter of about 23 mm. The frustoconical walls 41, 42 thus make it possible, due to the flaring thereof and therefore the space created, to install various types of rolling bearings. In particular, it is possible to integrate rolling bearings with dimensions larger than those of the rolling bearings of the state of the art, which makes it possible to avoid multiplying the rolling bearings, and while using appropriate rolling bearings to manage the forces passing through the rotary case 9 and the stationary case 15. Advantageously, the rolling bearings may have, between their inner ring inner diameter and their outer ring outer diameter, a radial thickness greater than a distance d separating the cylindrical wall 16 of the stationary case 15 and the inner wall 17 of the rotary case 9.

The module 1 includes a system 26 for changing the pitch of the blades 14 of the propeller 6 making it possible to vary the calibration or the pitch of the blades 14 around their radial axes A such that they occupy angular positions according to the operating conditions of the turbine engine and the flight phases in question. The pitch change system 26 is arranged in the space 24 formed by the inner wall 17 and the outer wall 18 of the rotary case. More specifically, the pitch change system 26 is arranged radially between the cylindrical wall 16 of the stationary case 15 and the outer wall 18 of the rotary case 9.

Figure 3:
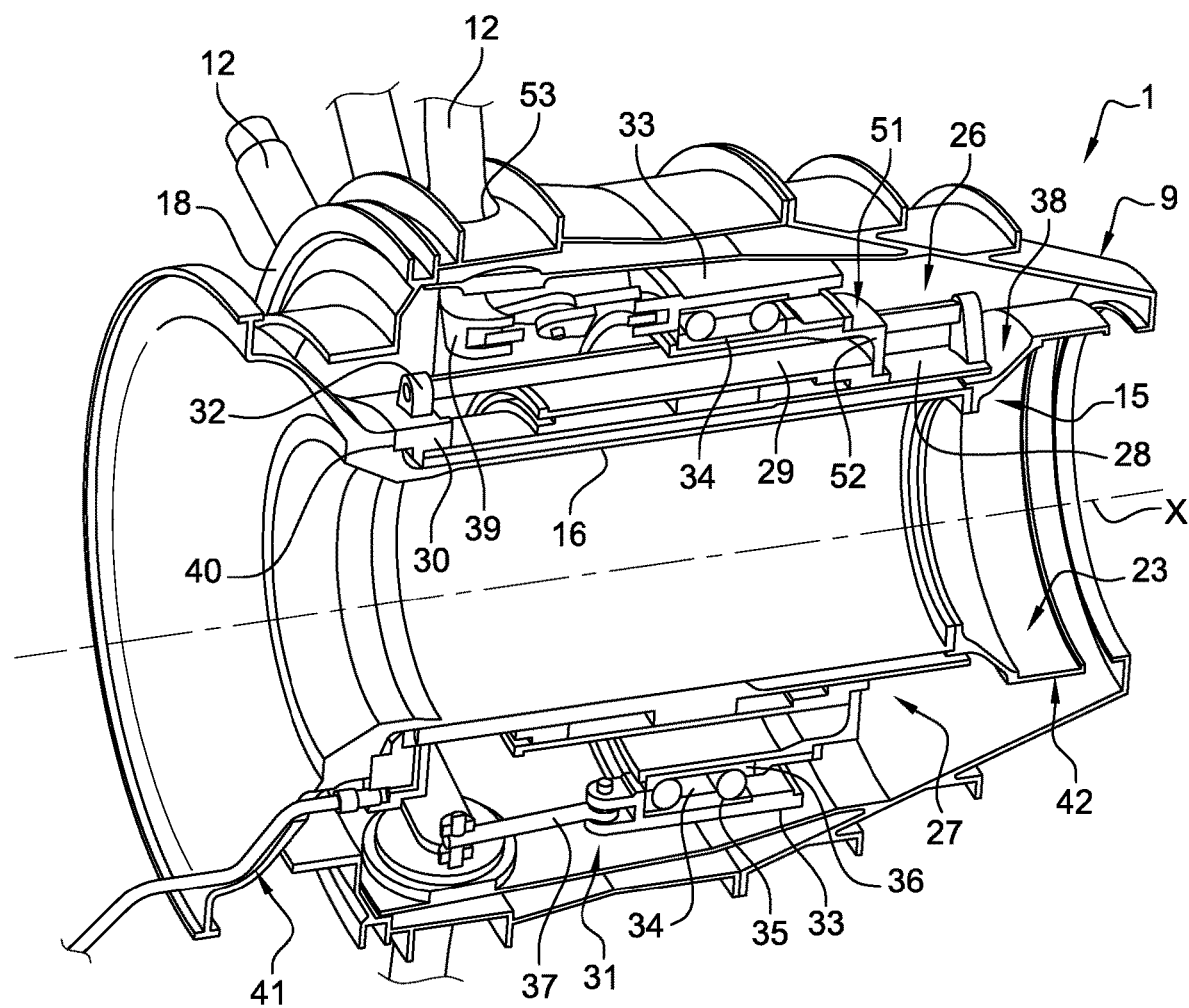
FIG. 3 is an axial sectional and perspective view showing certain details of the turbine engine module according to the invention.
Figure 4:
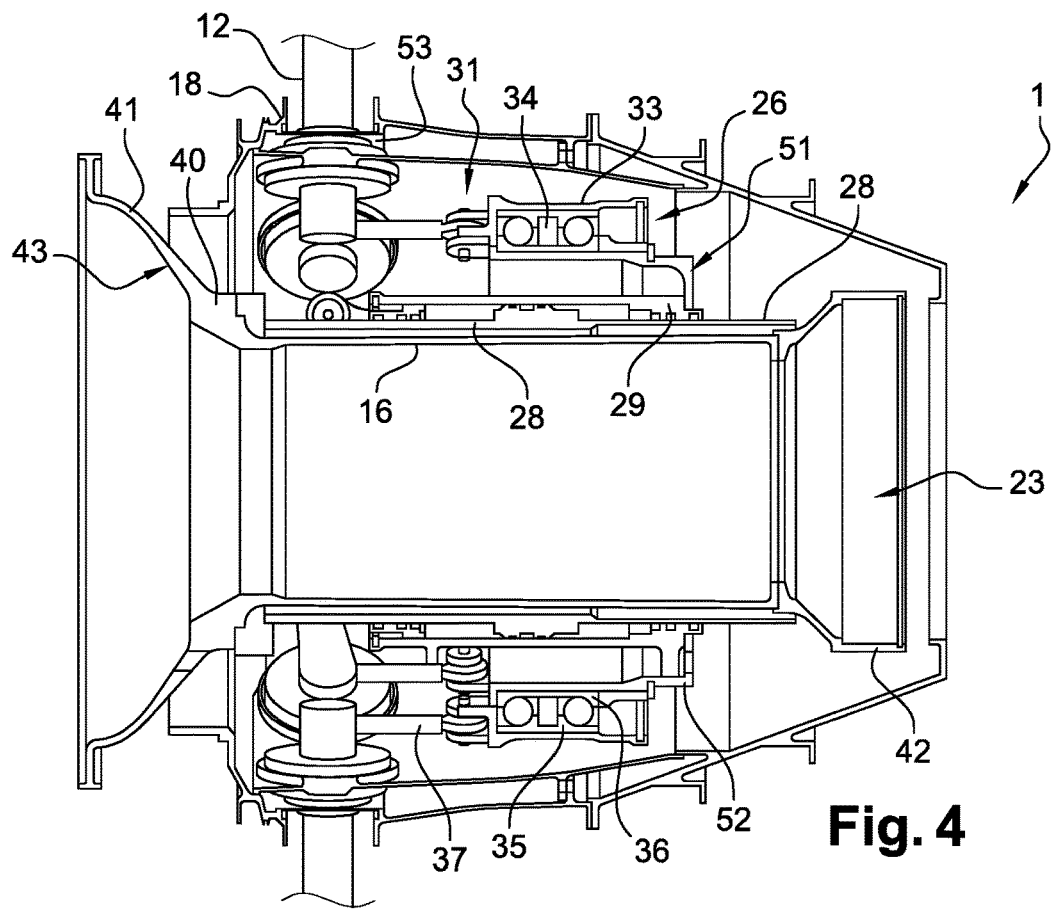
FIG. 4 is an axial sectional view of the module illustrated in FIG. 3.

To that end, in reference to FIGS. 3 and 4, the pitch change system 26 comprises a control means 27 controlling the pitch change of each of the blades 14 and a connecting mechanism 31 connecting the control means 27 to the root 13 of the blades 14. The control means 27 is housed between the rotary case 9 and the stationary case 15.

Figure 5:
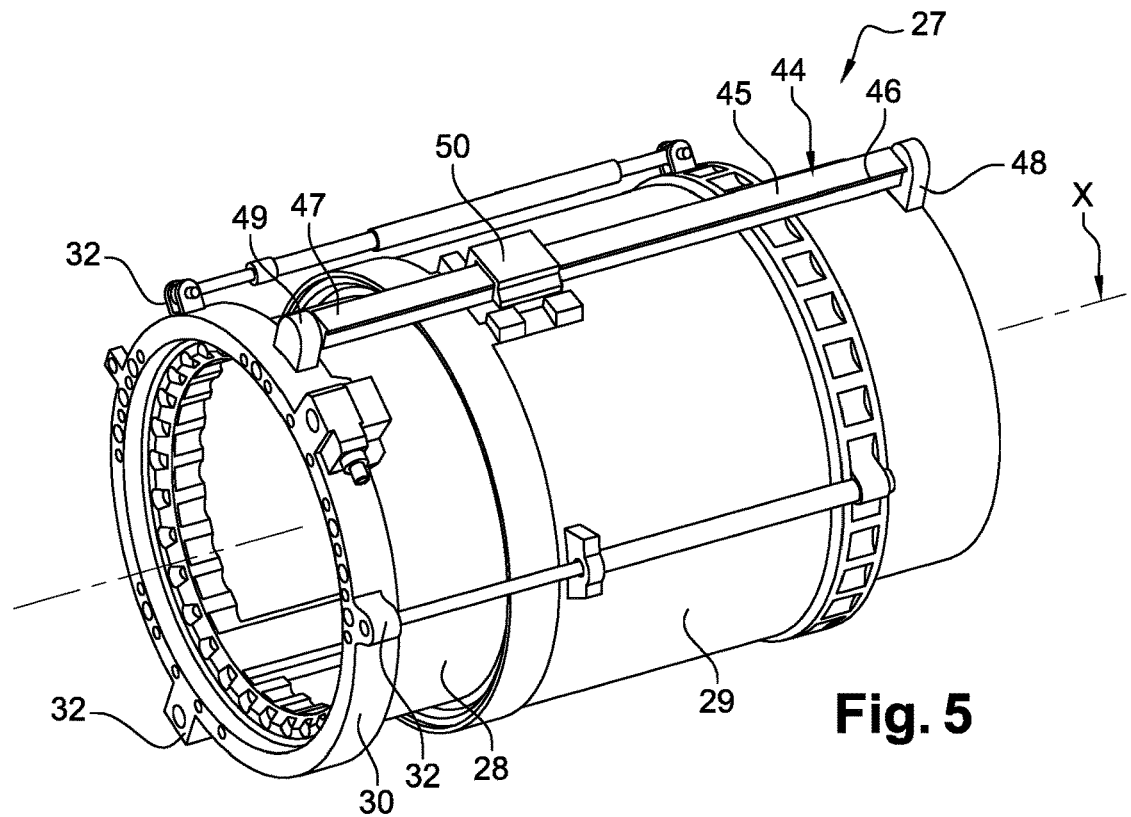
FIG. 5 is a perspective view of an example control means according to the invention.

In reference to FIG. 5, the control means 27 comprises an actuator that includes a stationary body 28 and a movable body 29 translatable relative to the stationary body 28 along the axis X. This actuator is attached on the stationary case 15. In other words, the latter is separated from the stationary case 15 and does not constitute a structural element belonging to the stationary case 15. The stationary body 28 is cylindrical with a circular section. This stationary body 28 surrounds the cylindrical wall 16 of the stationary case 15 and is mounted coaxial to the axis X. The stationary body 28 is assembled on the outer face 38 of the wall 16 so as to be immobilized in rotation and translation relative to the stationary case 15. To that end, the stationary body 28 comprises a connecting ring 30 provided at an upstream end of the stationary body 28 and abutting against a shoulder 40 of the stationary case 15. The connecting ring 30 is mounted forcibly on the stationary case 15.

The movable body 29 is arranged around the stationary body 28 so as to move axially under the action of a command from the actuator. The movable body 29 of the actuator moves only in translation. The latter 29 is immobilized in rotation relative to the stationary body using an anti-rotation device 44 fastened to the stationary body 38 and the movable body 29. This anti-rotation device 44 in particular makes it possible to prevent rotation of the actuator around the longitudinal axis X during the operation of the turbine engine 100. The anti-rotation device 44 includes a cross-piece 45 extending along an axis substantially parallel to the axis X. The cross-piece 45 is connected at a first end 46 to a yoke 48 fastened to the downstream edge of the stationary body 28, and at an opposite second end 47 to a base 49 provided on the connecting ring 30. The anti-rotation device 44 further includes a support 50 fastened on the movable body 29 serving as a radial stop. This support 50 is traversed by the cross-piece 45 and allows guiding of the movable body 29 during its axial movement.

The connecting ring 30 is provided with connecting interfaces 32 allowing the connection of various pieces of equipment necessary for the power supply and operation of the actuator. These connecting interfaces 32 comprise mechanical, hydraulic and electrical connectors ensure the passage of low-pressure and high-pressure hydraulic control lines (high flow rate and pressure).

The connecting mechanism 31 is arranged around the actuator. The actuator is arranged so as to move the connecting mechanism 31 axially, which is connected to the radial arms 12 of the blade root such that the axial movement of the connecting mechanism 31 causes the pitch change of the blades. In particular, the pitch change system 26 comprises a load transfer module 51 comprising a load transfer bearing 34 that is arranged between the connecting mechanism 31 and the movable body 29 so as to transmit the axial forces exerted by the movable body 29 of the actuator. The load transfer module 51 comprises an annular outer shroud 33 and inner shroud 52. The outer shroud 33 is connected to the connecting mechanism 31, while the inner shroud 52 is connected to the movable body 29. This bearing 34 comprises an outer ring 35 secured to the shroud 33 and an inner ring 36 secured to the shroud 52. The bearing 34 here is formed by a rolling bearing with two rows of balls that may be of the type with oblique contact oriented in opposite directions so as to optimize the transmission of the axial forces.

The connecting mechanism 31 further comprises a set of articulated connecting rods 37 that are distributed regularly around the actuator and that are intended to act on the root of the blades 14 to rotate them around their axis A. There are as many connecting rods 37 as there are blades. Each connecting rod 37 is articulated at a first end to the outer shroud 33 around an articulation axis parallel to the rotation axis A of the blades. The opposite second end of each connecting rod 37 is articulated to one of the radial shafts 12 along an articulation axis parallel to the rotation axis A of the blades. In other words, the articulation axes of each connecting rod 37 are parallel. The radial shaft 12 comprises, at a proximal end (close to the longitudinal axis X), a crank pin 39 (cf. FIG. 3) receiving the second end of the connecting rod 37. The connecting rods 37 are pulled via ball and socket joints at the shroud 33 and drive, through opposite ball and socket joints, the transverse crank pins 39 that define lever arms like a standard connecting rod-crank connection so as to facilitate their rotation. The crank pins 39 therefore pivot around a geometric axis A of the radial shaft 12 to which they are secured, such that the root 13 of the blades 14 rotate in their respective housings 11 of the polygonal ring 10 of the rotary case 9. It should be noted that the ball and socket joints associating the connecting rods 37 with the crank pins 39 then follow a circular trajectory centered on the axes A of the radial pivot shaft 12 of the blades 14, and with a relatively substantial lever arm (distance between the axis of the articulation at the crank pin and the axis A), which makes it possible to transmit forces (torques) accordingly by reducing the forces passing through the connecting rods and the actuator, and ultimately to be able to change the pitch of the blades without difficulty. The space 24 allows optimal integration of the pitch change system 26 into the rotary part compactly and robustly.

The blades 14 then simultaneously, through the axial movement of the set of connecting rods driven by the actuator, the requested position, i.e., a so-called "reverse" extreme position and a so-called "feathering" extreme position. In the reverse position, the blades participate in the braking of the aircraft, like standard thrust reversers. In the feathering position, the blades are then retracted as much as possible relative to the direction of advance of the airplane, for example, in case of engine failure, and thus offer the least resistance (drag) possible. The angular travel of the blades between the feathering and reverse positions is for example about 120°.

The actuator in the present invention advantageously comprises an annular power cylinder made up of its rod moving relative to a cylinder secured to the stationary case 15.

Advantageously, the cylindrical wall 16 is connected downstream to the first substantially frustoconical wall and upstream to the second substantially frustoconical wall 41. These frustoconical walls are arranged on separate parts so as on the one hand to facilitate the assembly of the pitch change system in the module, and on the other hand to facilitate the assembly of the first rolling bearing 19, which is inserted in the downstream direction directly between a radially outer face 21 of the inner wall 17 of the rotary case 9 and the radially inner face 23 of the first frustoconical wall, respectively. Advantageously, the first rolling bearing 19 is wider at the free end of the first substantially frustoconical wall, on the side opposite the cylindrical wall.

The invention claimed is:

1. A turbine engine module with longitudinal axis, the module including:
    a case comprising a propeller provided with a plurality of blades, the case configured to rotate around the longitudinal axis;
    a stationary case comprising a cylindrical wall extending between an inner wall and an outer wall of the case; and
    a system (26) for changing the pitch of the blades of the propeller comprising a connecting mechanism connected to the blades of the propeller and a control means acting on the connecting mechanism,
the cylindrical wall of the stationary case connected downstream to a first frustoconical wall and upstream to a second frustoconical wall, a first rolling bearing disposed between a radially outer face of the inner wall of the and a radially inner face of the first frustoconical wall, and a second rolling bearing disposed between the radially outer face of the inner wall of the case and an inner face of the second frustoconical wall.

2. The module according to claim 1, wherein the first and second frustoconical walls respectively flare in a direction parallel to the longitudinal axis.

3. The module according to claim 1, wherein the second rolling bearing has a diameter larger than the inner diameter of the cylindrical wall of the stationary case and the inner wall of the case.

4. The module according to claim 1, wherein the first rolling bearing has a diameter larger than the inner diameter of the cylindrical wall of the stationary case and the inner wall of the case.

5. The module according to claim 1, wherein the pitch change system is arranged axially between the first and second frustoconical walls and radially between the cylindrical wall of the stationary case and the outer wall of the case.

6. The module according to claim 1, wherein the control means is mounted non-structurally and separately from the stationary case, the control means comprising a stationary body secured to the outer face of the cylindrical wall and a movable body translatable along the longitudinal axis relative to the stationary body.

7. The module according to claim 6, wherein the movable body comprises a connecting ring provided with connection interfaces with the stationary case and secured to the outer face of the cylindrical wall of the stationary case.

8. The module according to claim 1, wherein a load transfer bearing is arranged between the connecting mechanism and the control means.

9. The module according to claim 3, wherein the pitch change system comprises an anti-rotation device fastened on the movable body and on the stationary body of the control means, the anti-rotation device comprising a cross-piece extending above the movable body and the stationary body.

10. The module according to claim 1, wherein the control means comprises an actuator, the movable body of which slides around the cylindrical wall of the stationary case.

11. The module according to claim 1, wherein the propeller is an upstream propeller of a pair of despun propellers.

12. A turbine engine comprising at least one module according to claim 1.

* * * * *